United States Patent
Ries et al.

[15] 3,656,038
[45] Apr. 11, 1972

[54] FIELD WEAKENING CIRCUIT FOR A SERIES FIELD MOTOR

[72] Inventors: Robert G. Ries, Milwaukee; Robert C. Montross, Mequon, both of Wis.

[73] Assignee: Square D Company, Park Ridge, Ill.

[22] Filed: Dec. 4, 1970

[21] Appl. No.: 95,047

[52] U.S. Cl. ..................................318/139, 318/251
[51] Int. Cl. ..................................................H02p 5/16
[58] Field of Search..............318/246, 251, 332, 139, 527, 318/528, 536, 537, 359; 317/13, 16

[56] References Cited

UNITED STATES PATENTS

| | | | |
|---|---|---|---|
| 3,384,799 | 5/1968 | Thiele | 318/251 |
| 3,382,409 | 5/1968 | Assow et al. | 317/16 |
| 3,360,705 | 12/1967 | Morris | 318/251 |
| 3,230,437 | 1/1966 | Cappello | 318/332 |

Primary Examiner—Bernard A. Gilheany
Assistant Examiner—W. E. Duncanson, Jr.
Attorney—Harold J. Rathbun and William H. Schmeling

[57] ABSTRACT

In a control system for a direct current series motor, the contacts of a single throw reed relay are responsive to motor current through a winding in a motor supply conductor to selectively control the application of a motor field weakening shunt resistor by a switching circuit. The charging of a timing capacitor delays action of the switching circuit to prevent motor "hunting". The opening of the reed relay contacts under low motor load conditions permits charging of the capacitor and activating of the switching circuit to place the shunt resistor across the motor field for high speed operation. Under increased motor load, the reed relay contacts close and the capacitor discharges to time the removal of the shunt resistor from across the field. A by-pass transistor by-passes the reed relay contacts preventing activation of the switching circuit until the motor has reached its maximum unweakened field speed and the relay is provided with shunt windings to prevent "chattering" due to wavering motor current.

13 Claims, 1 Drawing Figure

Patented April 11, 1972
3,656,038
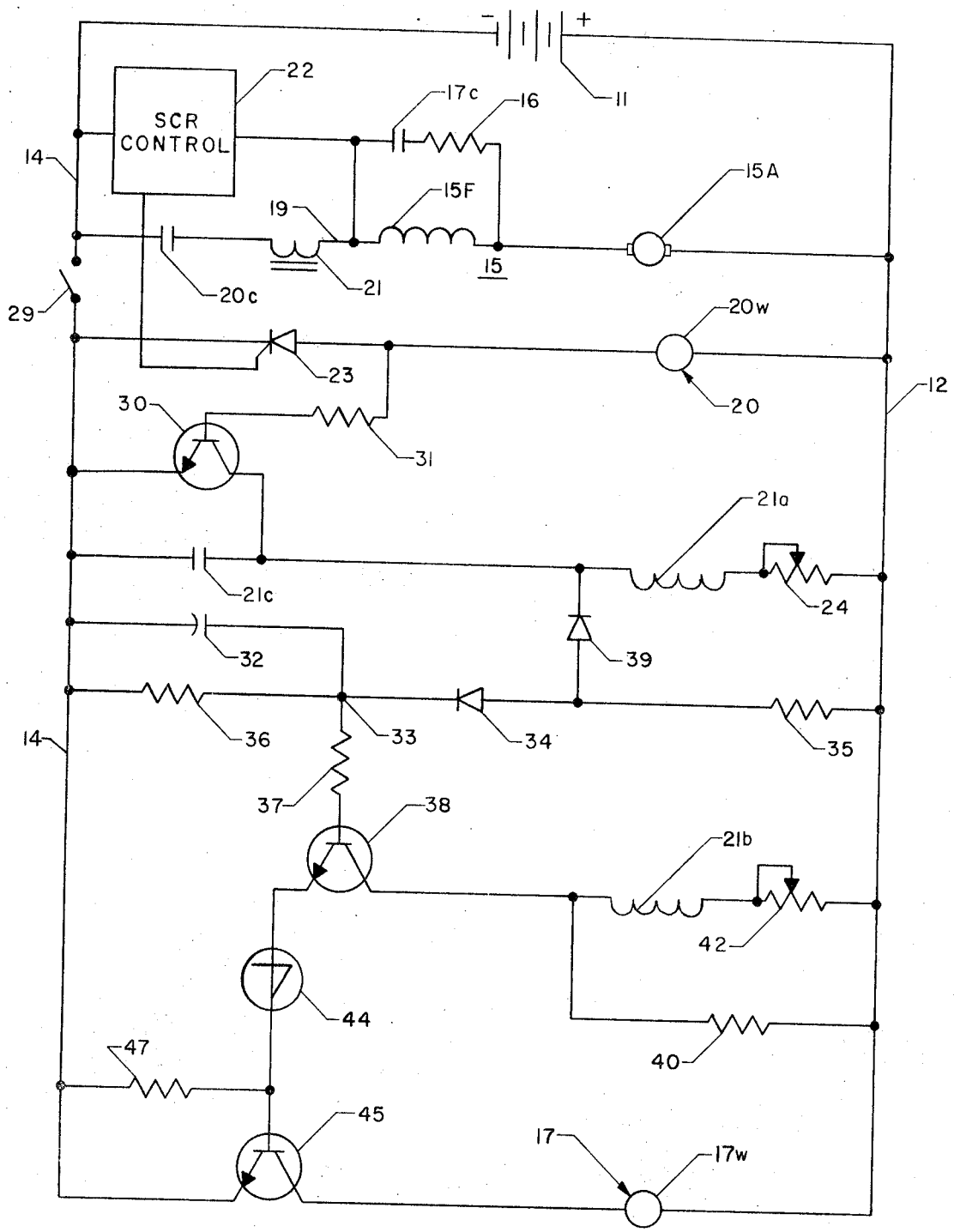
INVENTOR.
ROBERT G. RIES
ROBERT C. MONTROSS
BY Harold J. Rathbun

FIELD WEAKENING CIRCUIT FOR A SERIES FIELD MOTOR

The present invention relates to speed control systems for direct current series motors of the type useable as traction drive means for battery operated industrial trucks and the like, and more particularly to a circuit which will control the application and removal of a shunt resistor across a series field winding in accordance with the magnitude of the load on the motor.

To provide economical and efficient industrial trucks, the size of the motor must be minimized and the power output of the motor translated through a step down gear train to provide a relatively large torque at the driving wheels of the truck. Thus industrial trucks are generally limited to slow speed operation so that they can transport loads which are great in comparison with the size of the traction motor. However, it is at times desirable to be able to propel a truck faster than at load carrying speeds; such an instance may occur when a truck is required to move across a level surface of a warehouse in an unloaded condition to a load pick-up point. It is well known that the speed of a series motor increases when the strength of its field is reduced, a technique commonly known as field weakening. Field weakening may be accomplished either by connecting a resistive shunt across the field winding, by the use of a tapped field winding, or by splitting the field winding of the motor. The circuit according to the present invention may be used successfully with any of these arrangements.

Should the load on the motor be increased while the motor is operating under conditions wherein the field of the motor is weakened, e.g., the unloaded truck is driven up an incline, an increase in motor current will accompany the increased load and cause the motor to operate inefficiently, overheating and using excess battery current. The current may even rise to a value which will severely damage the motor or other electrical components in its power circuit.

Therefore, it is necessary to provide a circuit which is capable of automatically applying a shunt resistor across the motor field during high-speed, light-load operation and removing the shunt resistor upon application of a large load. Such a circuit is disclosed in application Ser. No. 819,925, filed Apr. 28, 1969, by Robert G. Ries and Kenneth W. Retzer and now U.S. Pat. No. 3,590,352, issued June 29, 1971. The prior circuit, however, requires the use of a double-throw reed relay which is expensive and not readily available commercially. Also, double-throw reed relays are susceptible to hysteresis in that they are capable of becoming "hung in the middle" during transfers from one contact to the other.

In prior art field weakening circuits, a change in motor current beyond a predetermined value causes the immediate application or removal of a field weakening resistor. Further, if the truck is being accelerated without a load, the field weakening resistor in such prior circuits is applied immediately upon termination of normal acceleration thereby not providing sequencing time between acceleration stages.

When the shunt resistor has been applied in response to a decrease in motor current, the weakened field reduces the generated counter-voltage of the motor (CEMF) and this results in an immediate increase in motor current. This current surge results in a torque increase that accelerates the motor to a new higher speed. In prior art devices, this current surge generally activates the circuit for removing the shunt resistor from the field as if it had been caused by an increased load. Then the resulting decrease in current again calls for application of the shunt resistor producing another current surge, this one being of shorter duration. In this manner, the motor "hunts" as its speed increases to its field weakened speed whereupon the shunt resistor is able to remain connected across the field. Prior art controls may also produce motor "hunting" when the field weakening resistor is removed.

It is, therefore, an object of the present invention to provide a control circuit for a direct current series motor wherein a single-pole relay, positioned to have its operation controlled by the current flow through the motor, is used to control the selective connection of a resistive shunt across the series field.

Another object of the present invention is to provide timing means to delay the connection and removal of the resistive shunt for a time sufficient to prevent motor "hunting".

Further objects and features of the invention will be readily apparent to those skilled in the art from the specification and appended drawing illustrating a preferred embodiment, in which a schematic wiring diagram of a direct current motor control circuit incorporating the features of the present invention is shown.

In the drawing, a source of direct current such as a battery 11 has its positive terminal connected to a conductor 12 and its negative terminal connected to a conductor 14. The battery 11 supplies direct current for a motor 15, preferably a series wound motor, having a series field 15F and an armature 15A. A field weakening resistor 16 and normally open contacts 17c of a field weakening relay 17 are serially connected with each other in parallel with the field 15F. A conductor 19 connects the motor 15 through a winding or current loop 21 and through normally open contacts 20c of a shorting relay 20 to the conductor 14. The current loop 21 preferably comprises a single winding formed in the conductor 19 or may be formed by passing the conductor 19 through a clip formed of magnetic material, as is disclosed in the concurrently filed application No. 95,163 in the name of Robert G. Ries and assigned to the assignee of the present invention. The current loop 21 serves as the primary winding for a relay means which is preferably a single pole single-throw reed relay comprising the current loop 21, normally open contacts 21c and a pair of auxiliary windings 21a and 21b. An SCR control 22 is connected serially with the motor 15 and in parallel with the shorting contacts 20c and current loop 21. A preferred SCR control 22 is described in U.S. Pat. No. 3,361,921, issued to Robert C. Montross and John P. Cooper on Jan. 2, 1968.

A winding 20w of the shorting relay 20 and a silicon controlled rectifier (SCR) 23 are serially connected between the conductors 12 and 14, and a variable resistor 24, the auxiliary winding 21a of the reed relay and reed relay contacts 21c are also serially connected between the conductors 12 and 14. A switch 29 is interposed in the conductor 14 between the junction with the contacts 20c and the junction with the SCR 23. A transistor 30 has its base connected through a biasing resistor 31 to the anode of the SCR 23. The transistor 30 is connected across the reed relay contacts 21c with the collector of the transistor 30 connected to the auxiliary winding 21a side of the reed relay contacts 21c and the emitter connected to the conductor 14 side of the reed relay contacts 21c.

A timing capacitor 32 is connected between the conductor 14 and a junction 33. The junction 33 is connected through a rectifier 34 and a resistor 35 to the conductor 12, through a resistor 36 to the conductor 14, and through a biasing resistor 37 to the base of a transistor 38. A rectifier 39 is connected between the anode of the rectifier 34 and the auxiliary coil 21a side of the reed relay contacts 21c.

The collector of the transistor 38 is connected to the conductor 12 through a resistor 40 and, by a parallel path, through the auxiliary winding 21b of the reed relay and a variable resistor 42. The emitter of the transistor 38 is connected to a threshold voltage responsive means such as a silicon unilateral type switch (SUS) 44 which is in turn connected to the base of a transistor 45. A resistor 47 is connected between the base of the transistor 45 and the conductor 14. The collector of the transistor 45 is connected through a winding 17w of the relay 17 to the conductor 12 and the emitter of the transistor 45 is connected to the conductor 14.

The SCR control 22, which is fully disclosed in the aforementioned U.S. Pat. No. 3,361,921, includes a pair of silicon controlled rectifiers which are alternately switched to the conductive state to supply the motor 15 with pulses of direct current for the purpose of controlling the speed of the motor by providing step-less acceleration and deceleration when the motor is operated at less than its maximum speed, the speed being determined by the setting of a control potentiometer (not shown). When the control potentiometer is set for high speed operation, the switch 29, which is mechanically coupled to the potentiometer, is closed to connect the battery 11 to the field weakening circuitry. When the motor 15 reaches a predetermined speed, the SCR control 22 causes the SCR 23 to switch to a conducting state, as disclosed in the Montross et al patent, and current flows through the winding 20w of the shorting relay 20. This closes the normally open contacts 20c and shorts out or bypasses the silicon controlled rectifiers within the SCR control 22 so that the motor is powered directly through a circuit from the battery 11 through the conductor 12, the armature 15A, the field 15F, the current loop 21, the contacts 20c and the conductor 14.

A charging circuit is provided for the capacitor 32 from the conductor 12 through the resistor 35, the rectifier 34, the junction 33, and the capacitor 32 to the conductor 14. The resistors 35 and 36 form a potential divider, the ratio of their resistances determining the voltage to which the junction 33 and accordingly the connected plate of the capacitor 32 will be raised. However, whenever the reed relay contacts 21c are in their closed position, the rectifier 39 and the contacts 21c form a by-pass around the capacitor 32 thereby diverting the current to prevent the charging of the capacitor 32. Thus, only when the reed relay contacts 21c are open can the capacitor 32 be charged. The rectifier 34 prevents the capacitor 32 from discharging through the by-pass circuit.

Since it is not desirable to start to charge the capacitor 32 and thereby raise the potential of the junction 33 until after the motor 15 has reached the speed at which the contacts 20c of the shorting relay 20 close, the transistor 30 is connected across the reed relay contacts 21c. Before the occurrence of both the closing of the switch 29 and the switching of the SCR 23 to conduction, the base of the transistor 30 is biased positively by the battery 11 through the coil 20w and the resistor 31. This causes the transistor 30 to conduct when the switch 29 has closed, by-passing the reed relay contacts 21c and completing the by-pass circuit around the capacitor 32 through the diode 39 and the transistor 30. After the SCR 23 has switched into conduction, the bias voltage to the base of the transistor 30 becomes negative and the transistor 30 stops conducting to unclamp the reed relay contacts 21c so that the electrical condition of the capacitor 32 is now determined solely by the condition of the reed relay contacts 21c.

Upon closure of the contacts 20c to provide power for the motor 15 directly from the battery 11 by bypassing the SCR control 22, magnetic flux is developed in the current loop 21 of the reed relay, the magnitude of the flux being dependent upon the current which flows through the motor and consequently through the current loop 21. The magnitude of the motor current is determined by the size of the load on the motor. It is well known that when the load on a series motor is increased, the speed and the counter emf decrease and the armature current and field strength increase, providing the necessary increase in motor torque. Therefore, under large load, the flux generated in the current loop 21 is high, while under low load, the flux generated in the current loop 21 is low.

If, upon closure of the shorting contacts 20c, the flux generated in the current loop 21 is insufficient to close the reed relay contacts 21c, the potential of the junction 33 tends to rise to the voltage dictated by the resistances of the resistors 35 and 36. The capacitor 32 now begins to charge through the resistor 35 and the rectifier 34 with the junction 33 side of the capacitor 32 being positively charged and the conductor 14 side being negatively charged so that the increase in potential of the junction 33 will be delayed for the time required for the charging of the capacitor 32, preferably about 0.5–0.8 seconds. When the capacitor 32 has charged to the biasing voltage of the transistor 38, the transistor 38 is biased for conduction. However, any current through the transistor 38 must pass through the SUS 44 and accordingly will be blocked until the forward breakover voltage of the SUS 44 is reached. The breakover voltage is supplied by the capacitor 32 through the base-emitter circuit of the transistor 38. When a sufficient voltage has been built up on the capacitor 32, the SUS 44 breaks over into conduction and a biasing voltage is applied to the base of the transistor 45 via the resistor 40, the transistor 38, and the SUS 44. The transistor 45 is thereby biased into conduction causing a current to flow from the conductor 12 through the winding 17w of the relay 17 and the transistor 45 to the conductor 14. The SUS 44 prevents biasing of the transistor 45 until saturation biasing voltage has built up so that the transistor 45 may function as a switching transistor. The energization of the winding 17w closes the normally open contacts 17c and places the field weakening resistor 17 across the motor field 15F to permit high speed operation of the motor during this low load condition.

The biasing of the transistor 38 and SUS 44 into conduction causes current to flow from the conductor 12 through the variable resistor 42, the auxiliary winding 21b of the reed relay, the transistor 38, the SUS 44 and the base-emitter circuit of the transistor 34 to the conductor 14. The auxiliary winding 21b is so wound that flux generated therein is in opposition to the motor current flux generated by the current loop 21. The strength of this opposing flux may be adjusted by changing the resistance of the variable resistor 42. The current through the auxiliary winding 21b thus generates flux helping to hold the contacts 21c open and the strength of this flux determines the magnitude of flux which must be generated by the current loop 21 to close the reed relay contacts 21c.

If an increased load is now applied to the motor 15 so that the motor current rises to a pre-selected value, the flux generated by the current loop 21 overcomes the flux in the auxiliary winding 21b and closes the reed relay contacts 21c. The charging current for the capacitor 32 is now diverted through the rectifier 39 and the contacts 21c so that charging of the capacitor 32 is terminated and the capacitor 32 discharges, principally through the circuit comprising the junction 33, the resistor 37, the transistor 38, the SUS 44, the base-emitter circuit of the transistor 45 and the conductor 14. The capacitor 32 also discharges through the resistor 36.

The conduction of the transistor 38 continues until the capacitor 32 has discharged to less than the biasing voltage of the transistor 38. The transistor 38 then turns off, whereby deenergizing the auxiliary coil 21b of the reed relay and blocking the base bias voltage for the transistor 45. After the transistor 38 has turned off, the SUS 44 and the transistor 45, no longer biased into conduction, turn off, blocking the current through the winding 17w of the relay 17. Consequent opening of the contacts 17c removes the field weakening resistor 16 from across the field 15F for lower speed and higher torque operation of the motor 15 during high load conditions.

The closing of the reed relay contacts 21c causes current to flow through the auxiliary winding 21a of the reed relay. The auxiliary winding 21a is so wound that flux generated therein augments the motor current flux generated in the current loop 21. The magnitude of the total flux may be adjusted by changing the resistance of the variable resistor 24. The current through the auxiliary winding 21a thus generates flux helping to hold the contacts 21c closed and the magnitude of this flux determines the amount by which the flux in the current loop 21 must be diminished before the reed relay contacts 21c open. The auxiliary windings 21a and 21b thus prevent motor "hunting" caused by the wavering motor current.

If the load on the motor 15 decreases by an amount sufficient to permit high speed, lower torque operation of the motor 15, the flux in the current loop 21 diminishes sufficiently to permit the reed relay contacts 21c to open and deenergize the auxiliary winding 21a. The by-pass circuit for the capacitor 32 is thus opened and the field weakening circuitry is activated as hereinbefore described to close the contact 17c of the relay 17 and place the field weakening resistor 16 across the motor field 15F.

If the motor is operating in a field weakening condition, i.e., the contacts 17c are closed, when the speed control potentiometer is adjusted for a lower speed operation, the switch 29 opens and interrupts the connection between the negative terminal of the battery 11 and the emitter of the transistor 45 and the cathode of the SCR 23 so that windings 17w and 20w are immediately de-energized. Any charge across the capacitor 32 which is present when switch 29 opens is discharged through the transistor 38 and the resistor 36 as previously described to condition the capacitor 32 for its timing function when the switch 29 is subsequently closed.

It can be seen from the foregoing discussion that the transistor 38, SUS 44, and transistor 45 form a control means for the relay 17 which in turn controls the connection of the field weakening resistor 16 across the field 15F. This control means functions in response to action of the reed relay contacts 21c after a time relay provided by the timing capacitor 32.

We claim:

1. A control circuit for a direct current motor having an armature and a series field, said control circuit comprising field weakening means for controlling the strength of the field, a control means having a first operative condition, wherein said field weakening means is rendered operative to weaken the field, and a second operative condition, wherein said field weakening means permits the field to return to its normal strength, a switching means responsive to the magnitude of the motor current for determining the operative condition of said control means, and timing means for delaying response of said control means to the determining action of said switching means.

2. A control circuit in accordance with claim 1 wherein said timing means includes a capacitor and a charging circuit therefore, and said switching means has one operative condition in which the capacitor is permitted to charge through its charging circuit, and said control means includes voltage responsive means responsive to a predetermined voltage increase at the capacitor to effect said first operative condition of said control means.

3. A control circuit in accordance with claim 2 wherein said switching means includes means activated when said switching means is in said one operative condition for maintaining said switching means in said one operative condition.

4. A control circuit in accordance with claim 2 wherein said switching means has an other operative condition in which the charging circuit for the capacitor is rendered ineffective.

5. A control circuit in accordance with claim 4 wherein a discharge circuit for the capacitor is provided that becomes effective upon the charging circuit being rendered ineffective, and said voltage responsive means is responsive to a pre-determined voltage decrease at the capacitor to effect said second operative condition of the control means.

6. A control circuit in accordance with claim 4 wherein said switching means includes means activated when said switching means is in said other operative condition for maintaining said switching means in said other operative condition.

7. A control circuit in accordance with claim 4 wherein said switching means comprises contacts which are open in said one operative condition of the switching means and closed in said other operative condition.

8. A control circuit in accordance with claim 7 wherein said switching means is a reed relay including said contacts.

9. A control circuit in accordance with claim 4 including speed regulating means for said motor having a maximum speed setting, and by-pass means connected across said switching means and operable to maintain the second operative condition of said control means only when said speed regulating means is at less than the maximum speed setting.

10. A control circuit in accordance with claim 9 wherein said by-pass means comprises transistor means which, when biased into conduction, maintains the second operative condition of said first switching means.

11. A control circuit in accordance with claim 1 wherein said field weakening means comprises a resistor and relay means for selectably connecting the resistor across said field.

12. A control circuit in accordance with claim 1 wherein said control means comprises a first transistor means for controlling current through said relay means, and means connected to said timing means for establishing a biasing voltage for said second transistor means.

13. A control circuit in accordance with claim 12 wherein said control means includes threshold voltage responsive means connected between said first and second transistor means.

* * * * *